US007560081B2

(12) United States Patent
Takai et al.

(10) Patent No.: US 7,560,081 B2
(45) Date of Patent: Jul. 14, 2009

(54) REACTOR AND PRODUCTION THEREOF, REFORMER, AND POWER SUPPLY SYSTEM INCLUDING PAIRED CHANNELS HAVING A HEAT EXCHANGER FORMED THEREON

(75) Inventors: Yuichi Takai, Tokyo (JP); Masayoshi Esashi, Miyagi (JP); Shuji Tanaka, Miyagi (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 10/854,044

(22) Filed: May 26, 2004

(65) Prior Publication Data
US 2004/0241061 A1    Dec. 2, 2004

(30) Foreign Application Priority Data
May 30, 2003    (JP)    ............................. 2003-154315

(51) Int. Cl.
*B01J 10/00* (2006.01)
(52) U.S. Cl. .................. 422/198; 422/188; 422/193; 48/89; 48/103; 48/118.5; 429/19
(58) Field of Classification Search ......... 422/129–242, 422/188–208; 429/12–46
See application file for complete search history.

(56) References Cited

U.S. PATENT DOCUMENTS

| 4,640,875 | A | * | 2/1987 | Makiel | ..................... 429/30 |
| 6,117,578 | A | | 9/2000 | Lesieur | |
| 6,470,569 | B1 | | 10/2002 | Lippert et al. | |
| 6,896,855 | B1 | * | 5/2005 | Kohler et al. | ............... 422/191 |
| 6,946,113 | B2 | * | 9/2005 | Seaba et al. | ............. 423/648.1 |
| 7,014,835 | B2 | * | 3/2006 | Mathias et al. | .............. 423/652 |
| 7,041,260 | B1 | * | 5/2006 | Hong et al. | ................. 422/198 |
| 2002/0139114 | A1 | * | 10/2002 | Dickau | ....................... 60/300 |
| 2003/0027022 | A1 | * | 2/2003 | Arana et al. | .................. 429/17 |
| 2003/0159307 | A1 | * | 8/2003 | Sago et al. | .................... 34/107 |
| 2003/0159354 | A1 | * | 8/2003 | Edlund et al. | ............. 48/127.9 |
| 2003/0180216 | A1 | * | 9/2003 | TeGrotenhuis et al. | ...... 423/659 |
| 2004/0018129 | A1 | * | 1/2004 | Kawamura et al. | .......... 422/211 |
| 2004/0025784 | A1 | | 2/2004 | Kawamura et al. | |
| 2004/0034266 | A1 | * | 2/2004 | Brophy et al. | .............. 585/658 |
| 2004/0043263 | A1 | * | 3/2004 | Takeyama et al. | ............. 429/19 |
| 2004/0228781 | A1 | * | 11/2004 | Tonkovich et al. | .......... 422/222 |

FOREIGN PATENT DOCUMENTS

| EP | 1 125 630 A | 8/2001 |
| WO | WO 98/55812 A | 12/1998 |
| WO | WO 99/41015 A | 8/1999 |

* cited by examiner

*Primary Examiner*—Alexa D Neckel
*Assistant Examiner*—Imran Akram
(74) *Attorney, Agent, or Firm*—Robert J. Depke; Rockey, Depke & Lyons, LLC.

(57) ABSTRACT

The present invention is to provide a thin miniaturized reactor for chemical reaction with effective use of heat. The reactor has paired channels formed on a substrate such that the channels extend close to and along each other and are provided with a heat exchanger for efficient heat exchange between the channels. The reactor is produced by forming on substrates the paired channels and heat exchanger and then bonding the substrates together. This manufacturing method is simple and reduces steps.

27 Claims, 13 Drawing Sheets

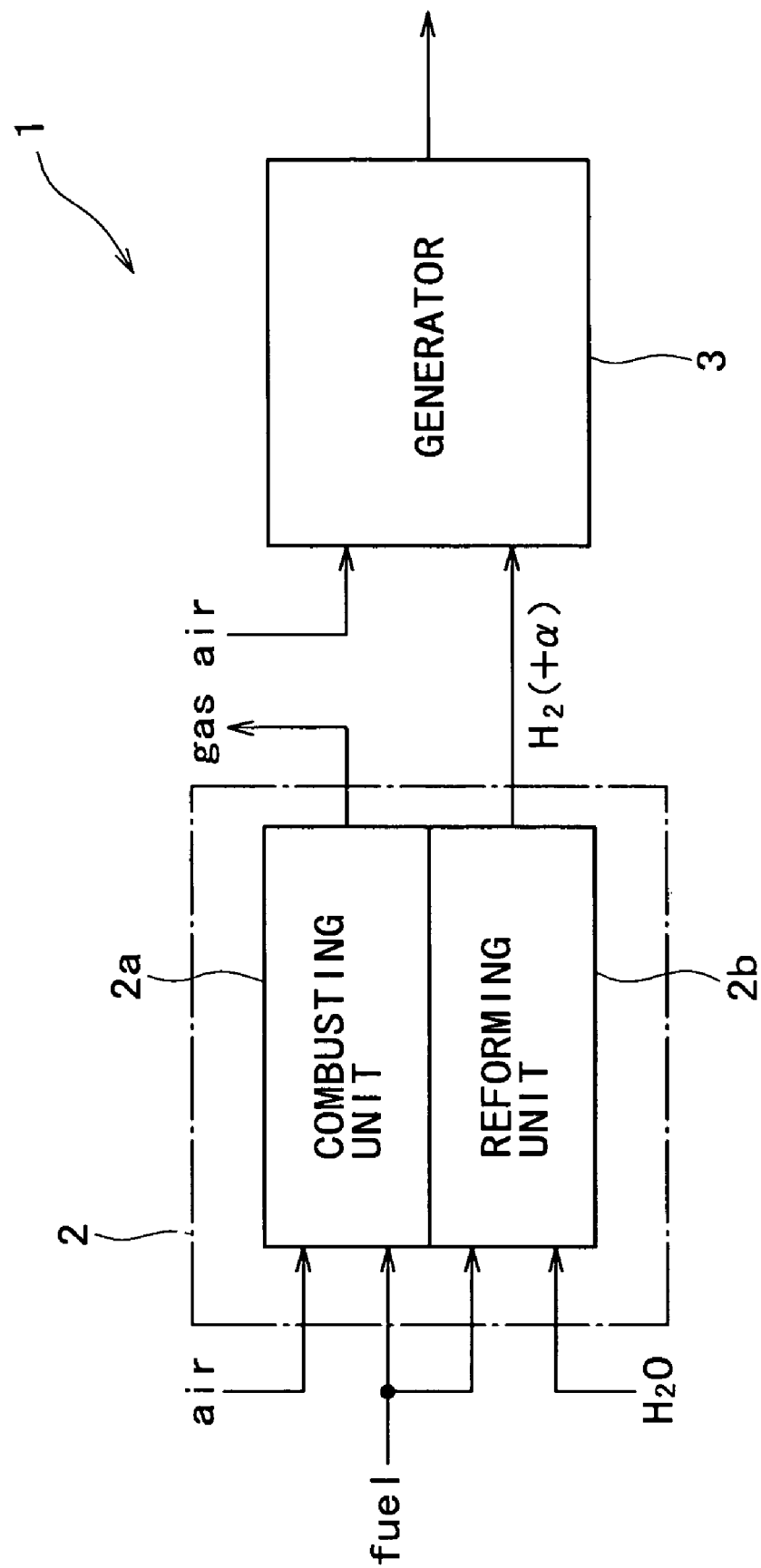

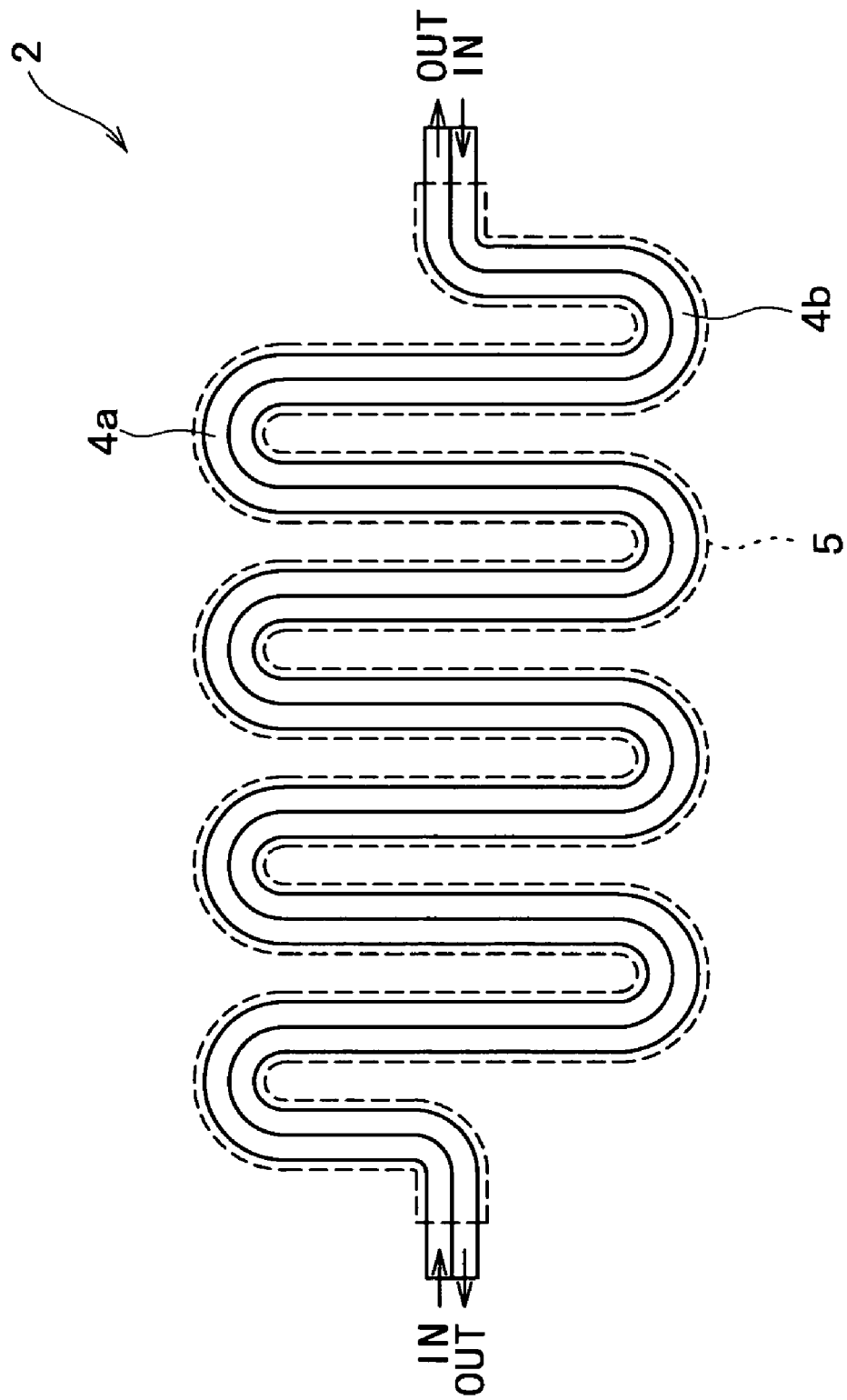

REACTOR AND PRODUCTION THEREOF, REFORMER, AND POWER SUPPLY SYSTEM INCLUDING PAIRED CHANNELS HAVING A HEAT EXCHANGER FORMED THEREON

BACKGROUND OF THE INVENTION

The present invention relates to a technology for chemical reactions through effective use of heat from a heat source, which is applicable to reactors to be produced by microfabrication, reformers based on said reactors, and power supply systems.

A fuel cell as a new power source is expected to find use for portable electronic machines and equipment because of its higher energy density and longer life compared with secondary batteries. There are several types of small-sized fuel cells, which consume hydrogen (stored in a hydrogen occluding material) as fuel or methanol solution as fuel, or which employ the direct methanol system so designed as to produce output through direct reaction in the cell. Recently, attempts are being made to develop the small-sized fuel cell of reforming type, which is constructed such that hydrocarbon fuel (such as methanol) passes through a reformer to yield hydrogen, which subsequently reacts with oxygen in the cell to generate electric energy.

Production of hydrogen with a high conversion efficiency has become possible owing to catalyzed chemical reactions in a chemical apparatus called "micro-reactor", which is formed on a silicon wafer by the semiconductor process. This technique is suitable for small-sized reformers.

One example of such reformers is known as the tubular reactor of cantilever structure. (See patent document; International publication No. 03/013729, pamphlet.) This reactor has two separated U-shaped channels made of thin silicon nitride tube. The free ends of the channels form the reaction zones covered with silicon. Between the tubes are a number of silicon slabs (joining them together) for heat exchange.

The conventional apparatus, however, has the following problems involved in the device structure and the temperature distribution in the heat exchanger that connects the channels to each other.

The heat exchanger should provide uniform temperature distribution in the reactor for high heating efficiency. (It is necessary to avoid local temperature fluctuation.) This requirement leads to a heat exchanger in complex structure, which needs a number of parts and manufacturing steps. These factors prevent size reduction, thickness reduction, cost reduction, and efficiency improvement.

Moreover, uneven temperature distribution in the reactor tends to give rise to by-products, thereby decreasing reaction efficiency.

In addition, it is necessary that waste heat originating from fuel combustion should be effectively used to heat fuel for reforming; otherwise, considerable heat loss is accompanied by outflow (emission) of fluid, which lowers the efficiency of the apparatus.

SUMMARY OF THE INVENTION

It is an object of the present invention to provide a reactor performing reactions by effective use of heat and that can be made thin and small in size.

To achieve the above object, according to the first aspect of the present invention, there is provided a reactor including paired channels for fluids to undergo chemical reactions therein. The paired channels are formed on a substrate such that the channels extend close to and along each other and also being provided with a heat exchanger performing heat exchange between the paired channels.

According to the second aspect of the present invention, there is provided a method for producing a reactor having paired channels for fluids to undergo chemical reactions therein. The method includes a step of forming on a substrate paired channels arranged close to and along each other, a step of forming on another substrate a heat exchanger for heat exchange between the paired channels, and a step of bonding the two substrates together.

According to the third aspect of the present invention, there is provided a reformer including paired channels to reform a fluid flowing through the channels, with a first channel serving for fuel heating and a second channel serving for reaction, in which the heating channel and reaction channel are formed on a substrate such that the heating and reaction channels extend close to and along each other and have a heat exchanger for heat exchange between the paired channels.

According to the fourth aspect of the present invention, there is provided a power supply system including a reformer and a power generator. The reformer has paired channels to reform a fluid flowing through the channels, with a first channel serving for fuel heating and a second channel serving for reaction, in which the heating channel and reaction channel are formed on a substrate such that the channels extend close to and along each other and have a heat exchanger for heat exchange between the channels. The power generator generates electricity by reacting a fluid, which has been reformed after passing through the reaction channel, with another material.

The present invention is directed to a reactor, a reformer, and a power supply system, each including paired channels formed on a substrate such that they extend close to and along each other and a heat exchanger for heat exchange between the channels.

The reactor, reformer, and power supply system according to the present invention each have paired channels extending close to and along each other and a heat exchanger for heat conduction between the channels in a specific region (such as the one in an adiabatic space). This construction contributes to highly efficient heat exchange and uniform temperature distribution in the reactor. Moreover, this construction provides a sufficiently large thermal contact area owing to the heat exchanger, as compared with the conventional heat exchanging structure forming channels in simple thermal contact with each other. The heat exchanger is simple in structure.

The present invention is directed also to a method for producing a reactor including a step of forming on a substrate paired channels arranged close to and along each other, a step of forming on another substrate a heat exchanger for heat exchange between the paired channels, and a step of bonding the two substrates together.

The method according to the present invention offers the advantage of simplifying the structure and reducing the number of manufacturing steps. This advantage is obtained by forming the channels and heat exchanger on separate substrates and subsequently bonding the substrates together.

With this configuration, reaction can be achieved by effective use of heat efficiently transmitted from one channel to another. This contributes to efficiency improvement and size reduction. Moreover, it is possible to realize a simple structure and reduce the number of production steps by bonding together a substrate having channels formed thereon and another substrate having a heat exchanger formed thereon.

BRIEF DESCRIPTION OF THE DRAWINGS

These and other objects of the invention will be seen by reference to the description, taken in connection with the accompanying drawing, in which:

FIG. 1 is a diagram showing the basic structure of the power supply system according to the present invention.

FIG. 2 is a conceptual diagram showing the basic structure of the reformer according to the present invention.

DETAILED DESCRIPTION OF THE PREFERRED EMBODIMENTS

Figure 3A:
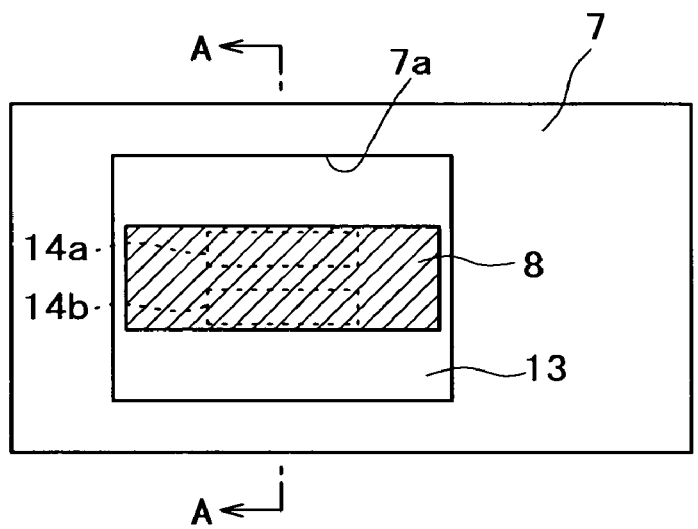
FIGS. 3A to 3C are diagrams showing a substrate in which are formed a catalyst carrier and a heat exchanging means as the constituents of the reactor.

The present invention relates to a reactor, reformer, and power supply system. The reactor has a means to chemically react fluids in the channels. The reformer, which is based on the reactor, is, for example, an apparatus for producing hydrogen by reforming from fuel. The power supply system generates electricity by reaction between a reformed substance and another substance. (It is exemplified by a fuel cell system, which generates electricity by reaction between hydrogen and oxygen.) They are applicable to high-temperature reactors, which are required to be small and thin. Incidentally, the "power supply system" includes any power supply unit based on fuel cells and any electronic machines and equipment, such as information processing equipment, video equipment, imaging equipment, mobile communication terminals, and robots.

FIG. 1 is a diagram showing the basic structure of the power supply system according to the present invention.

The power supply system 1 has the reformer 2 and the generator 3.

The reformer 2 forms the combusting unit 2a and the reforming unit 2b. The combusting unit 2a permits fuel and air to pass through the unit 2a and eventually to be discharged from the unit 2a. The reforming unit 2b is supplied with fuel and water, and the unit 2b reforms fuel with water vapor.

Incidentally, the fuel includes, for example, alcohols (such as methanol and ethanol), hydrocarbons (such as natural gas, propane, naphtha, kerosene, and butane), and any material that gives hydrogen upon decomposition (such as ammonia and chemical hydrides like $NaAlH_4$ and $NaBH_4$).

The reformer 2 has paired, channels (one or more pairs), one channel constituting the combusting unit 2a (which serves for fuel heating) and another channel constituting the reforming unit 2b (which serves for reaction). The fuel is reformed as it passes through the channel for reaction and then the fuel is supplied to the generator 3.

The generator 3 causes the fluid, which has passed through the reaction channel for reformation, to react with the other material, thereby generating electricity. The fluid may be hydrogen produced by reforming, which is accomplished with the help of a supported catalyst placed in the reaction channel of the reforming unit 2b. The other material may be oxygen in the air. Thus, the reaction between hydrogen and oxygen generate electric power, which is supplied to devices connected to the generator 3. Incidentally, the reformer 2 and the generator 3 may optionally be connected via an intermediate processing unit for removal of carbon monoxide or separation of hydrogen.

FIG. 2 is a conceptual diagram showing the basic construction of the reformer 2.

The paired channels 4a and 4b are formed on a substrate to extend close to and along each other. The channel 4a serves for heating and the channel 4b serves for reaction, for example. It should be noted that the fluids in the channels flow in the opposite direction as indicated by arrows.

The heat exchanging means (or heat exchanger) 5 performs heat exchange between the channels 4a and 4b. The exchanger 5 is arranged along the channels, so that the exchanger 5 efficiently transfers heat from the heating channel to the reaction channel. The heating channel is provided with a heat source or a heating means. The heat exchanger 5 transfers the generated heat to the reaction channel, and the transferred heat promotes reforming by the supported catalyst placed in the reaction channel.

Incidentally, the channels in this example are formed in a meandering pattern on the substrate, so that they have a sufficient length for heat exchange in a small-sized device. Moreover, the channels may be formed in one or more pairs on the substrate.

It is desirable to form the channels 4a and 4b and the heat exchanger 5 by using so-called MEMS (Micro Electro Mechanical Systems) technology, which is based on the semiconductor manufacturing process, so that the resulting device is thin and small in size. (Recent development in electronic device technologies and micromachine technologies has made compact devices feasible.) For example, the channels 4a and 4b may be formed by dry etching that forms grooves on a substrate. Likewise, the heat exchanger 5 may be formed on a substrate from a heat-conducting material, or the heat exchanger 5 may have a heat-pipe structure.

Figure 3B:
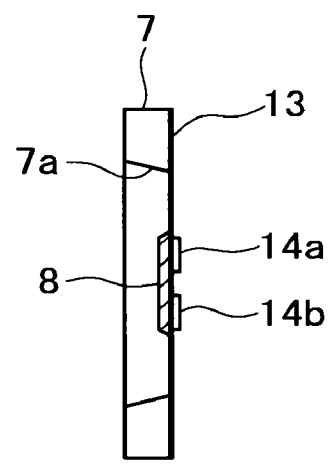
Figure 3C:
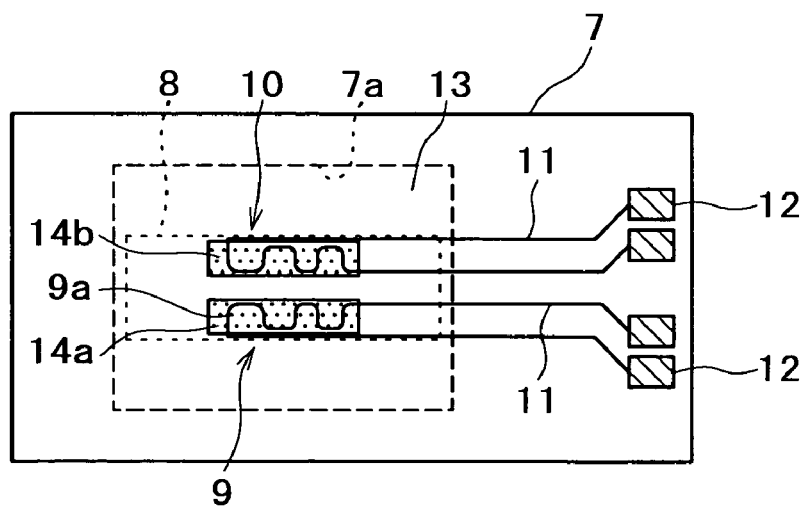
Figure 4A:
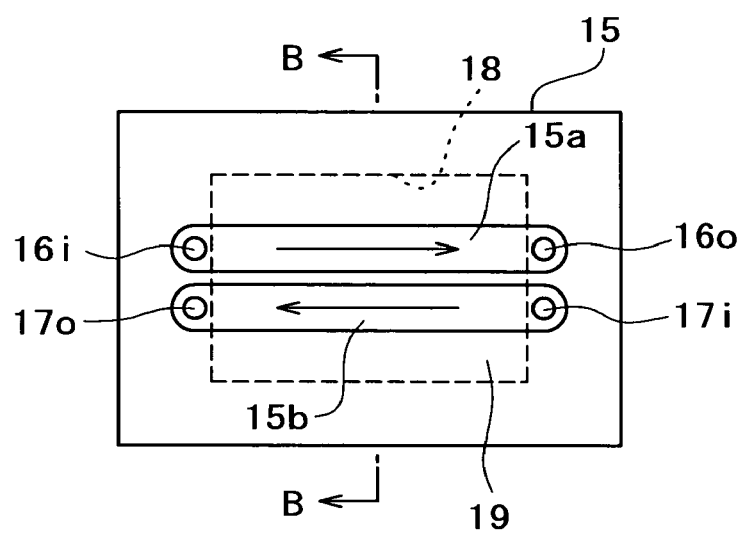
FIGS. 4A to 4C are diagrams showing a substrate in which are formed grooves of channels as the constituents of the reactor.
Figure 4B:
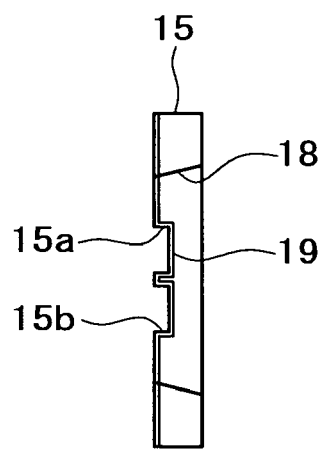
Figure 4C:
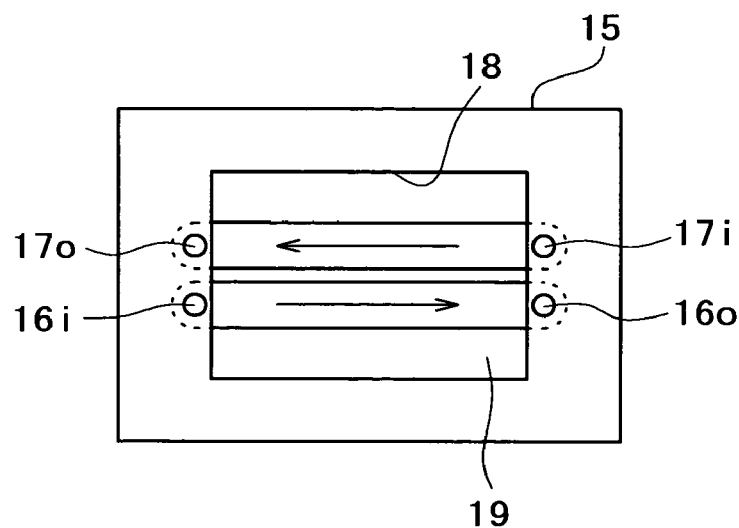
Figure 5:
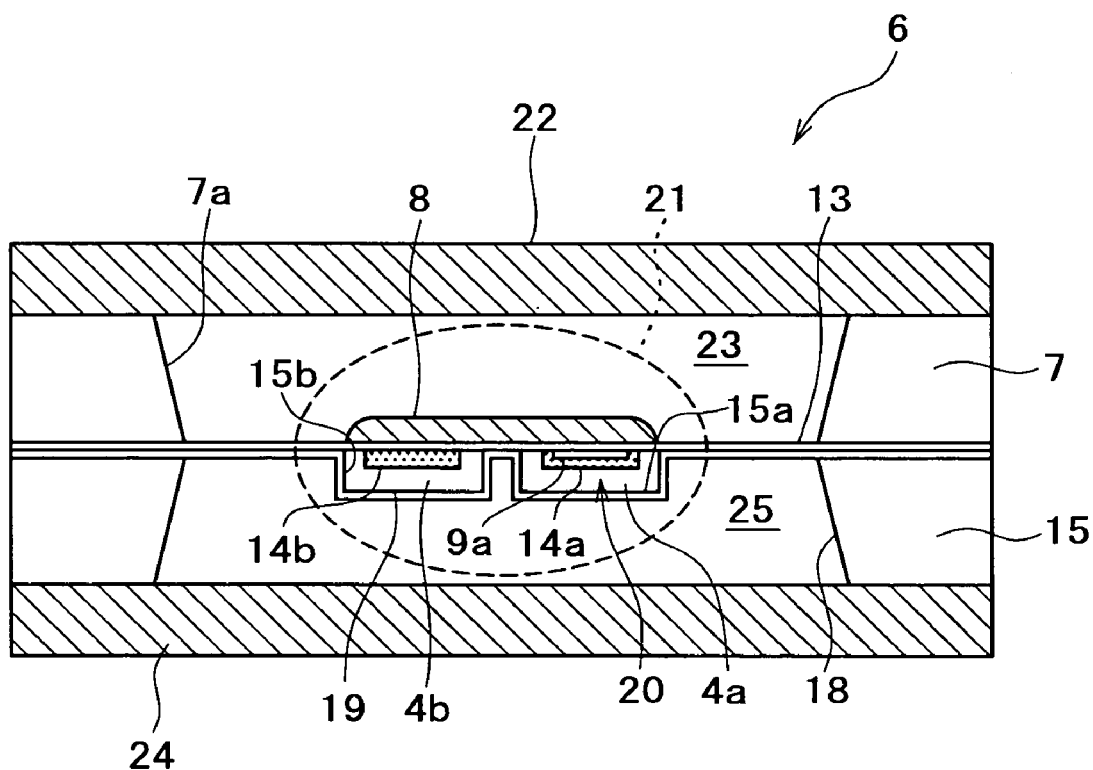
FIG. 5 is a cross sectional view showing the structure of the reactor, with the substrates bonded together.

FIGS. 3A, 3B, and 3C to 5 are schematic diagrams showing the structure of the reactor 6 constituting the reformer 2 (with the thickness of the substrate exaggerated). Incidentally, FIGS. 3A to 3C show the substrate in which are formed the catalyst carrier and the heat exchanger, FIGS. 4A to 4C show the substrate in which are formed the channels, and FIG. 5 shows the cross section of the substrates bonded together.

FIG. 3A is a plan view of the substrate 7 as viewed in the direction perpendicular to its surface. FIG. 3B is a sectional view taken along the line A-A. FIG. 3C is a rear view of the substrate 7.

The substrate 7 (silicon substrate or the like) has a rectangular recess 7a formed in one surface thereof. In the recess 7a is formed the heat exchanger 8 made of a highly heat conductive material. The heat exchanger is a rectangular equalizer, which is formed, as mentioned later, by forming a boron-diffused layer ($p^{++}$ layer) on the silicon substrate and subsequently removing its surrounding silicon, thereby forming the recess 7a.

The substrate 7 also has a temperature controlling element 9, a temperature detecting element 10, wiring patterns 11, and connecting terminals 12, which are formed on its reverse side (opposite to that side on which the heat exchanger 8 is formed).

The temperature controlling element 9 is a heater 9a, such as a resistance heating element made of a high resistance material. The heater 9a is electrified so that the fuel is burned when the apparatus is started. The temperature detecting element 10 is a temperature sensor using the temperature characteristics of a resistor. In this embodiment, it is mounted in the reaction channel. The wiring patterns 11 and 11 are connected to the connecting terminals 12 and 12 through which the heater is supplied with electricity and the sensor outputs its signals. The terminals are connected further to an external circuit or control circuit (not shown). Incidentally, as shown in the A-A cross section of FIG. 3B, these elements and wiring patterns are formed on a thin film 13 of silicon oxide (about 5 to 10 μm thick). On the outer surface of the thin film are formed the catalyst carriers 14a and 14b.

The catalyst carriers 14a and 14b are porous alumina or the like that support a catalyst. The catalyst is selected from metals of groups 8 to 10, such as nickel and cobalt and alloys thereof, according to the fuel to be used. The catalyst carrier 14a that supports a catalyst for combustion is held on the surface of the heater 9a. The catalyst carrier 14b that supports a catalyst for reaction is held on the surface of the region including the temperature detecting element 10.

FIG. 4A is a plan view of the substrate 15 as viewed in the direction perpendicular to its surface. FIG. 4B is a sectional view taken along the line B-B. FIG. 4C is a rear view of the substrate 15.

The substrate 15 (silicon substrate or the like) has two paired grooves 15a and 15b formed in one surface thereof. These grooves constitute the above-mentioned channels 4a and 4b, respectively. For example, the groove 15a constitutes the heating channel, at both ends of which are formed the inlet 16i and outlet 16o for fuel. The heating channel permits fuel to flow from the inlet 16i to the outlet 16o, so that fuel burns during its flow. The groove 15b constitutes the reaction channel, at both ends of which are formed the inlet 17i and the outlet 17o for the material to be reformed (or fuel). The reaction channel permits fuel to flow from the inlet 17i to the outlet 17o, so that the material undergoes reformation during its flow. The gas resulting from reformation is discharged from the outlet 17o.

The substrate 15 also has a rectangular recess (cavity) 18 formed on its reverse side (opposite to that side on which the grooves 15a and 15b are formed). This recess may be formed by performing partial etching on the silicon substrate.

Incidentally, for easy understanding, the example shown here is assumed to have two grooves 15a and 15b extending along each other on the substrate. That part in which these grooves are formed is a silicon oxide thin film 19 (about 5 to 10 μm thick).

When the substrate 7 and the substrate 15 are bonded together, the groove 15a constitutes the channel 4a for combustion and the groove 15b constitutes the channel 4b for reformation, as shown in FIG. 5. These channels are thermally connected to each other through the head exchanger 8.

There exists in the heating channel 4a the heating means 20, which constitutes of the heater 9a and the catalyst carrier 14a. The heating means burns the fuel supplied to the heating channel. The heat of combustion from the combustion channel 4a is transferred to the reaction channel 4b through the heat exchanger 8.

There exists in the reaction channel 4b the catalyst carrier 14b, so that the fuel flowing through the reaction channel 4b receives heat from the heat exchanger 8 and undergoes reformation.

The structure 21 (encircled by an ellipse of broken line in FIG. 5), which includes the channels 4a and 4b and the heat exchanger 8, should preferably be contained in a heat-insulating space. This object is achieved if the recess 7a in the substrate 7 is closed with a sealing substrate 22 (such as a cover glass) so that the space 23 is formed, or if the recess 18 in the substrate 15 is closed with a sealing substrate 24 (such as a cover glass), so that the space 25 is formed. These spaces prevent heat from escaping from the heat exchanger and channels to the outside of the substrates. Incidentally, the heat-insulating spaces 23 and 25 may be kept at a reduced pressure or filled with a gas having a low thermal conductivity so that they produce a better heat insulating effect without requiring complex structure.

Figure 6:
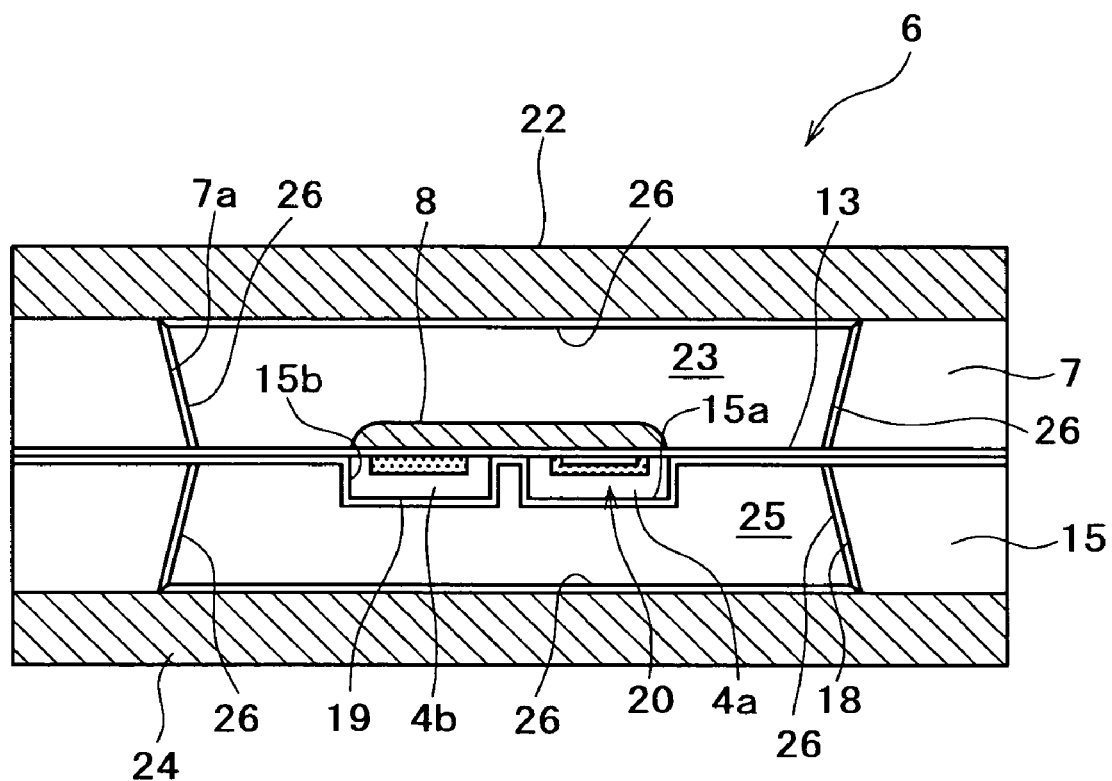
FIG. 6 is a diagram showing an example in which the heat-insulating space has an internal wall of reflecting film.

Also, as shown in FIG. 6, the heat insulating spaces should preferably have their walls coated with a reflecting film 26 such as aluminum, which effectively prevents radiant heat (or infrared rays) from escaping.

The structure 21 mentioned above is supported at a desired position in the heat insulating spaces 23 and 25. Supporting is accomplished by the thin films 13 and 19 in this example.

The fine structure mentioned above can be produced by using the microprocessing technology. It is useful for efficient heat exchange for a small, thin apparatus.

Figure 7:
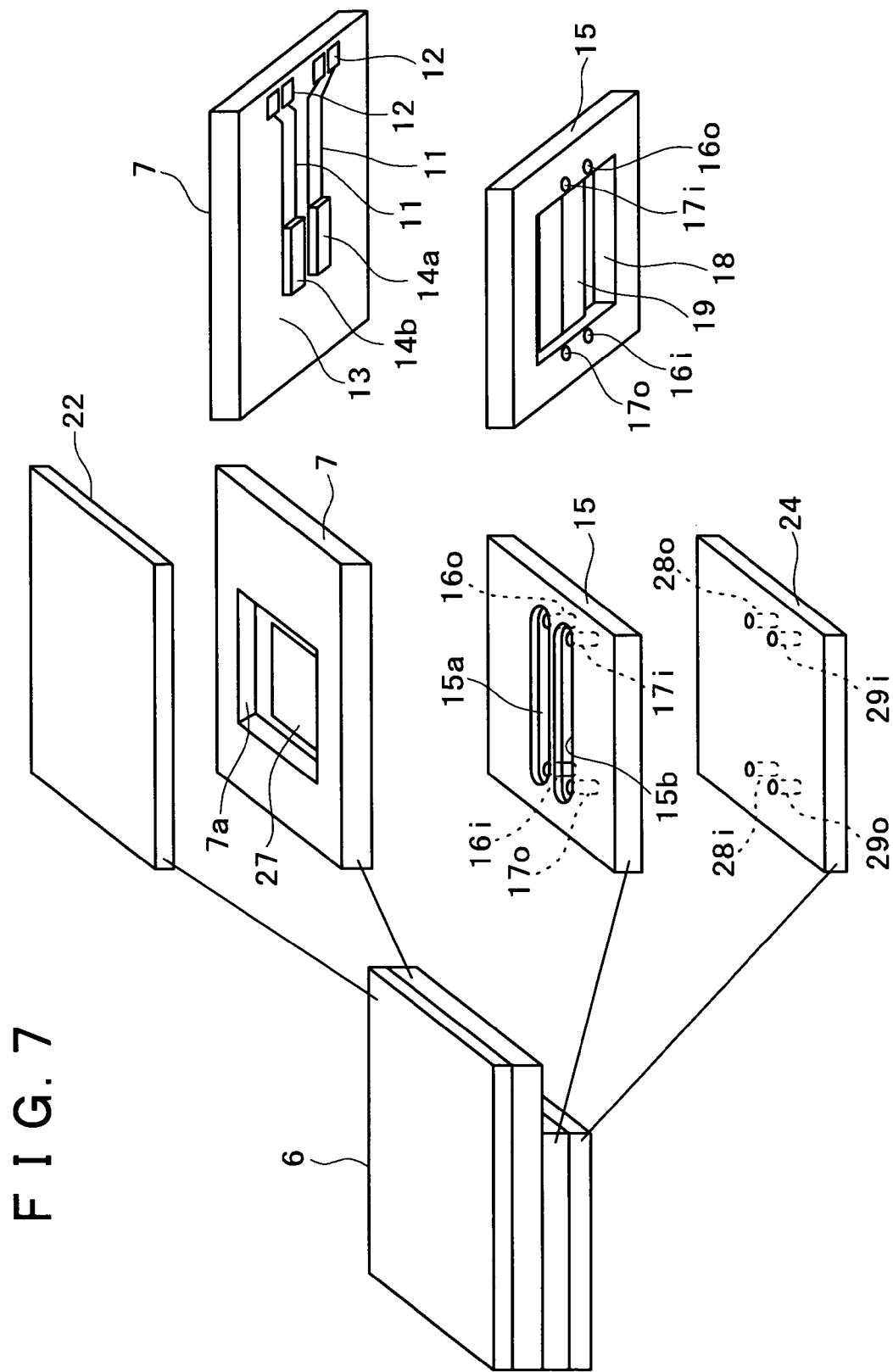
FIG. 7 is a perspective view showing an example of the reactor using four substrates.

FIG. 7 is a perspective view showing an example of the reactor 6 forming four substrates in which the channels and heat exchangers are formed.

The first substrate 22 may be formed from any material, which is not specifically restricted. However, selection of material should be made in consideration of adhesion to the second substrate 7, linear expansion coefficient, and thermal conductivity. For example, in the case where the second substrate 7 is that of silicon, the first substrate 22 should preferably be that of silicon, ceramics, glass, or synthetic resin (such as polyimide, polytetrafluoroethylene, and PDMS [polydimethylsiloxane]). Bonding between the first substrate 22 and the second substrate 7 should be accomplished by anodic bonding, adhesion (with a resin adhesive), thermal contact bonding, or laser welding.

The second substrate 7 is usually that of silicon; however, it may also be made of ceramics or resin.

The second substrate 7 has the recess 7a formed in one surface (front face) thereof. The recess 7a functions as the heat insulating space 23, and the bottom of the recess 7a is left as a thin film. It may be formed by RIE (dry etching), wet etching, UV light etching, laser etching, proton beam etching, etching by electron beam writing, or micromolding. Plasma etching or solution anisotropic etching is desirable. Unless a very thin bottom is necessary, the recess 7a may be formed by mechanical process such as sand blasting.

On the bottom of the recess 7a is formed the equalizer 27 functioning as a heat exchanger. The equalizer 27 should be made of a material with high thermal conductivity. This object is achieved by diffusing impurity ions (such as boron ions) into the silicon substrate, thereby partially increasing its thermal conductivity. The object may also be achieved by forming a metal film on the bottom from a metallic material (such as Cu, Al, Ni, Au, Ag, Pt, etc.) with high thermal conductivity, or by bonding a metal sheet or foil to the bottom.

The first substrate 22 is bonded to the second substrate 7 (having the equalizer 27 formed in the recess 7a), so that the recess 7a is covered by the first substrate 22 and the heat insulating space is formed. Bonding of the two substrates should preferably be accomplished in a vacuum (or under reduced pressure) or by anodic bonding in a gas with low thermal conductivity. Anodic bonding is suitable for adhesion between two semiconductor wafers or adhesion between glass and semiconductor wafer. Anodic bonding for a glass substrate and a silicon substrate is accomplished by applying a negative voltage (about −500V) to the silicon substrate, with the glass substrate grounded (GND), at a prescribed temperature (400° C. to 450° C.), while keeping them in close contact with each other through their mirror-finished surfaces. The glass substrate should be alkali glass (Pyrex glass). In the case of non-alkali glass, it is necessary to previously cover the bonding surface with alkali metal (such as sodium) by vapor deposition.

On the reverse face (opposite to the recess 7a) of the second substrate 7 are formed a heater and sensor (not shown), wiring patterns 11, and terminals 12 for external connection, and further formed the catalyst carriers 14a and 14b. The catalyst carrier should be a porous layer (such as sintered ceramics), which provides a sufficient surface area for catalyst. With the second substrate 7 bonded to the third substrate 15 (mentioned later), the catalyst carriers 14a and 14b are respectively positioned in the channels. If the porous layers are formed before the bonding of the substrates, the catalyst can be placed anywhere in the channel.

The third substrate 15 has grooves to constitute channels. It is usually made of silicon; however, it may also be made of ceramics or synthetic resin.

The third substrate 15 has grooves 15a and 15b formed in one surface (front face) thereof. The grooves may be formed by the same process as used for forming the recess 7a. However, in the case of silicon substrate, they may be formed simply by patterning and ensuing etching. The grooves should be meandering rather than straight, so that the resulting channels are as long as possible for efficient heat exchange through a large heat exchanging area.

On the reverse face (opposite to the grooves) of the third substrate 15 are formed the recess 18. This is achieved by forming an oxide film, nitride film, or impurity ion diffused layer on the surface (including the groove walls) of the third substrate 15 and then performing etching from the reverse side such that the film or layer is left. In this way the thin film forms the grooves constituting the channels. That part having been removed by etching becomes the recess 18, which is subsequently covered by the fourth substrate 24 so that the space for heat insulation is formed.

The ends of the grooves 15a and 15b are left intact without etching from the reverse side, and through-holes serving as inlets (16i, 17i) and outlets (16o, 17o) for fluids are formed therein by leaser beam machining.

The second substrate 7 and the third substrate 15 may be bonded together directly or indirectly (with an adhesive interposed between them). The substrates should preferably be bonded together before the recesses 7a and 18 are formed.

The fourth substrate 24 is a sealing substrate; it should preferably be made of any material highly compatible with the third substrate 15 (as in the first substrate 22).

Bonding between the third substrate 15 and the fourth substrate 24 should be accomplished by anodic bonding, adhesive bonding, thermal contact bonding, or laser welding.

Covering the recess 18 (formed in the third substrate 15) with the fourth substrate 24 forms the space 25 for heat insulation. The fourth substrate 24 has the inlets (28i, 29i) and outlets (28o, 29o) for fluids at their respective positions corresponding to the inlets (16i, 17i) and outlets (16o, 17o) for fluids formed in the third substrate 15.

The space for heat insulation is enclosed by the walls of the recesses 7a and 18 and the inside of the sealing substrates (the first substrate 22 and the fourth substrate 24). These bounding surfaces may be coated with the reflecting film 26 as mentioned above. In this case, the reflecting film 22 should be formed before the substrates are bonded together.

After the first to fourth substrates have been bonded together, the heaters and sensors are connected to wiring. In this way the reactor 6 is completed and put to use by supply of fluids. The reactors may be used individually or in combination with one another. In the latter case, the reactors may be connected in series or in parallel.

FIGS. 8A to 12C are diagrams illustrating the method for producing the above-mentioned reactor. (In these figures, the substrate is depicted as having an exaggeratedly large thickness relative to its length for easy understanding.) The manufacturing method according to the present invention forms two independent steps. The first step is to form channels extending close to and along each other on the substrate. The second step is to form the heat exchanging means on the other substrate. Finally, the two substrates are bonded together to give the structure that permits heat exchange between the channels through the heat exchanging means.

Figure 8A:
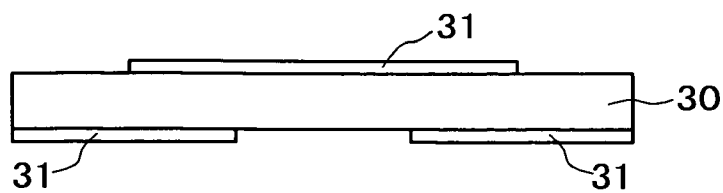
FIGS. 8A to 8I are diagrams illustrating the steps of the manufacturing method applied to the second substrate.
Figure 8B:
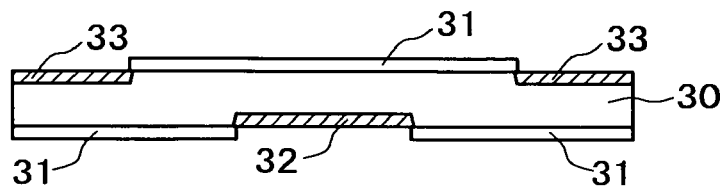
Figure 8C:
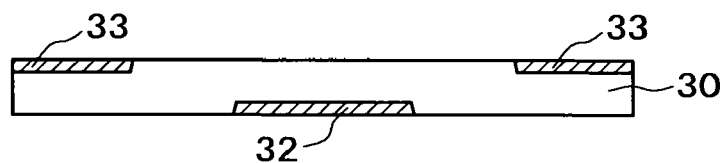
Figure 8D:
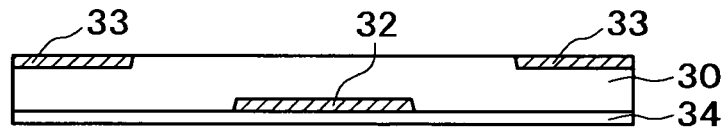
Figure 8E:
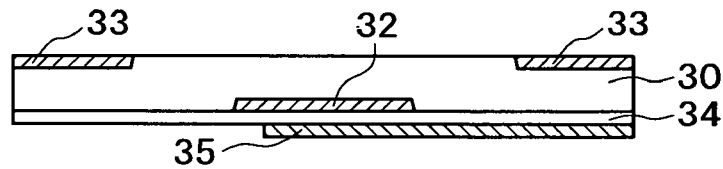
Figure 8F:
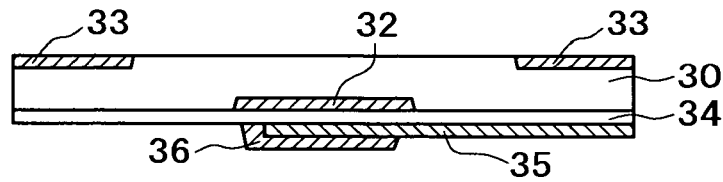
Figure 8G:
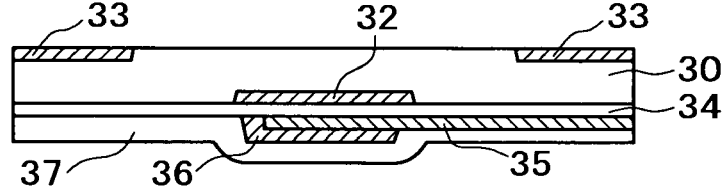
Figure 8H:
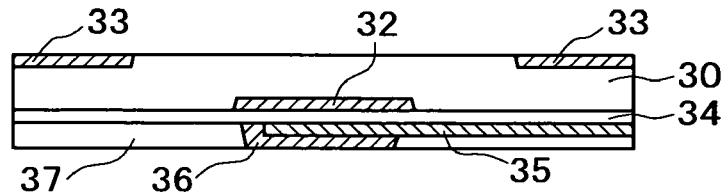
Figure 8I:
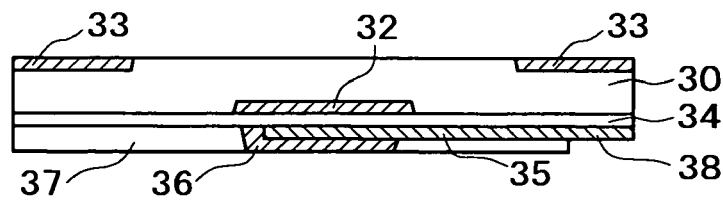

FIGS. 8A to 8I are diagrams showing the following steps to be performed on the second substrate 7, in which: FIG. 8A shows the patterning; FIG. 8B shows the boron diffusion; FIG. 8C shows the etching; FIG. 8D shows the formation of oxide film; FIG. 8E shows the formation of heater, sensor, and wiring pattern; FIG. 8F shows the formation of catalyst carrier; FIG. 8G shows the formation of oxide film; FIG. 8H shows the grinding; and FIG. 8I shows the etching.

FIG. 8A is to form the thermal oxide films ($SiO_2$) 31, 31, . . . in a prescribed region on each surface of the silicon substrate 30. (In FIGS. 8A to 8I, the upper and lower surfaces are referred to as "the first surface" and "the second surface", respectively.)

FIG. 8B is to diffuse boron into that region of the substrate surface in which the thermal oxide film 31 is not formed. Diffusion of boron forms the part 32 corresponding to the equalizer 27 in the region where the thermal oxide film 31 is not formed on the second surface of the substrate 30. In other words, according to this method, the heat exchanger is formed by diffusion of impurity into the substrate 30. In this example, the substrate is made to locally increase in thermal conductivity by diffusion of impurity ions into silicon. Incidentally, the diffusion layers 33 and 33 are formed also on the first surface of the substrate 30 and are used as masks in the subsequent steps. (See FIG. 10B.)

FIG. 8C is to remove the thermal oxide film 31 from the first and second surfaces of the substrate 30 by etching. FIG. 8D is to form the oxide film ($SiO_2$) 34 on the second surface of the substrate 30 by CVD (Chemical Vapor Deposition).

FIG. 8E is to form the circuit pattern 35 (for heater, temperature sensor, and wiring pattern) on the oxide film 34. This pattering is accomplished by plasma CVD with polysilicon (polycrystal silicon).

FIG. 8F is to form the catalyst carrier 36 of porous material in the following manner. The patterns of the heater and sensor are formed by screen printing from a solution of alumina ($Al_2O_3$), and the printed patterns are fired. In FIG. 8G, the surface of the catalyst carrier layer 36 is coated with the oxide film ($SiO_2$) 37. The oxide film serves as an electrical insulator and also provides a flat surface for direct bonding after grinding. With its surface ground, the oxide film permits the heater, sensor, and wiring to be embedded therein.

FIG. 8H is to perform grinding (CMP or the like) to such an extent that part (catalyst bed) of the catalyst carrier layer 36 is exposed. FIG. 8I is to remove part of the oxide film 37 by etching, thereby forming the electrode pad 38 for electrical connection with external circuits.

Incidentally, according to the method employed in this example, the equalizer is formed by diffusion of impurity ions into silicon, as in FIG. 8B, which locally increases thermal conductivity. The equalizer may also be formed from a material with high thermal conductivity; for example, by vapor deposition of metal film on the substrate or by bonding a metal sheet or foil to the substrate (on the assumption that the bottom has a sufficient strength). Although FIG. 8F shows the step of forming the carrier layer 36 and then causing it to support the catalyst, this step may be replaced by permitting the catalyst layer to be formed directly (by printing or ink-jet technique).

Figure 9A:
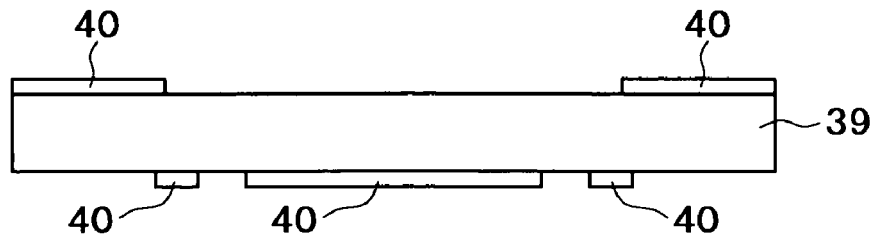
FIGS. 9A to 9E are diagrams illustrating the steps of the manufacturing method applied to the third substrate.
Figure 9B:
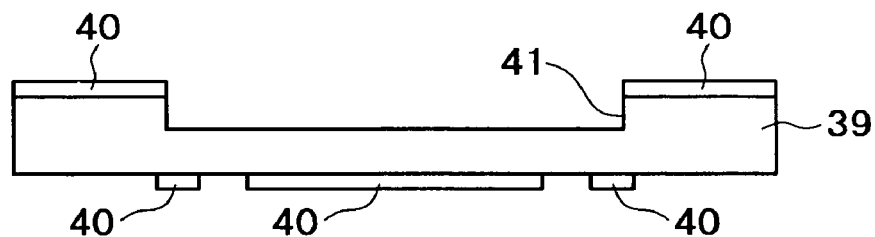
Figure 9C:
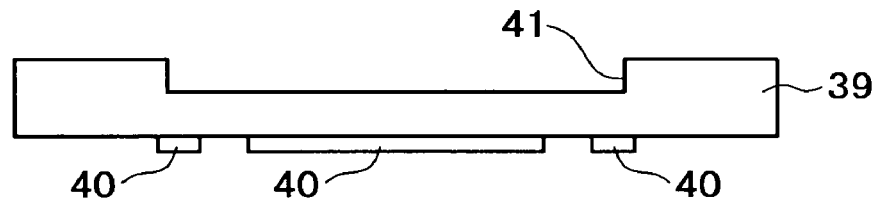
Figure 9D:
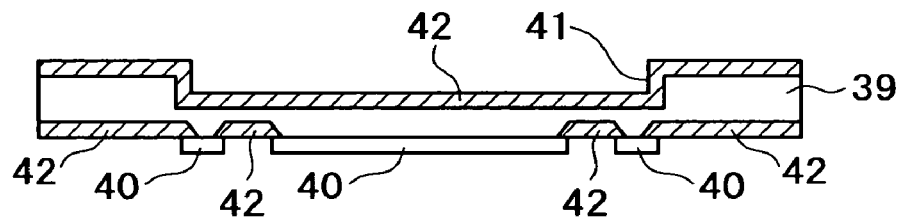
Figure 9E:
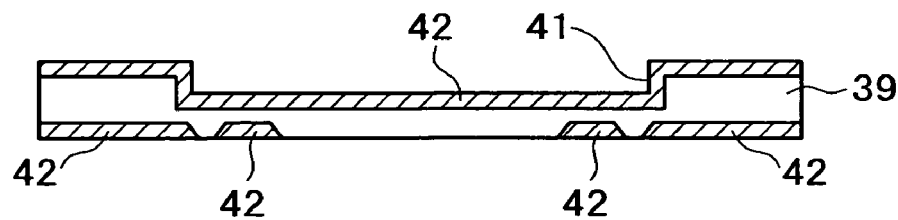

FIGS. 9A to 9E are diagrams showing the following steps to be performed on the third substrate 15, in which: FIG. 9A shows the patterning; FIG. 9B shows the formation of groove; FIG. 9C shows the etching; FIG. 9D shows the boron diffusion; and FIG. 9E shows the etching.

FIG. 9A is to form the thermal oxide films (SiO$_2$) 40, 40, . . . in a prescribed region on each surface of the silicon substrate 39. (In FIGS. 9A to 9E, the upper and lower surfaces are referred to as "the first surface" and "the second surface", respectively.) This step provides the mask for the subsequent steps.

FIG. 9B is to perform dry etching (DRIE: Deep Reactive Ion Etching) or anisotropic wet etching on the first surface of the substrate 39. This etching removes that part (Si) of the substrate where the thermal oxide film 40 is not formed, thereby forming the groove 41 (corresponding to the above-mentioned grooves 15 and 15b).

FIG. 9C is to perform etching on the first surface of the substrate 39, thereby removing the thermal oxide films 40 and 40. FIG. 9D is to form the boron diffusion layer 42 on the whole area of the first surface of the substrate 39 and on that region of the second surface in which the thermal oxide film 40 is not formed. The boron diffusion layer is used as the mask in the subsequent step.

FIG. 9E is to remove the thermal oxide films 40, 40, . . . from the second surface by etching.

Figure 10A:
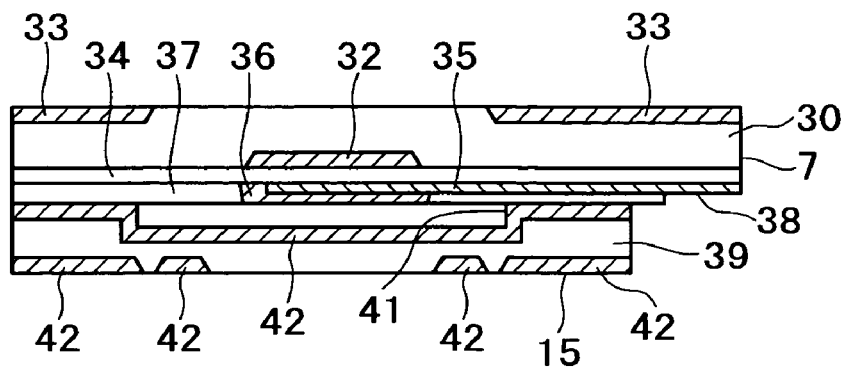
FIGS. 10A to 10C are diagrams illustrating the steps of the manufacturing method applied to the bonding of four substrates.
Figure 10B:
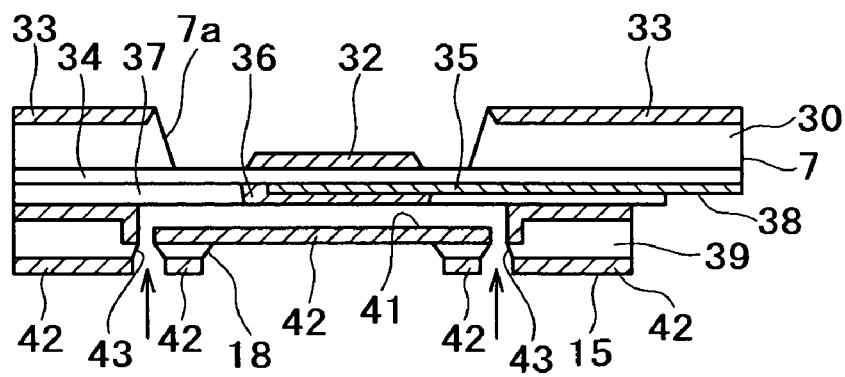
Figure 10C:
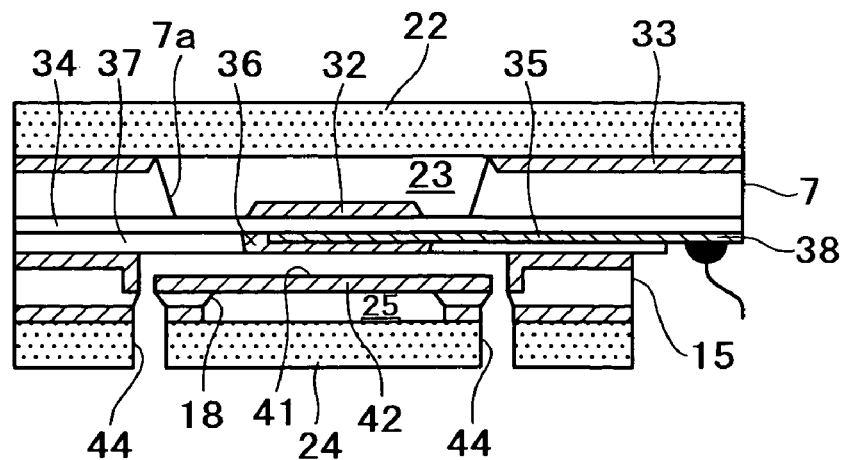

FIGS. 10A to 10C are diagrams illustrating the steps of bonding together four substrates (including the second substrate 7 and the third substrate 15) for integration in the following manner, in which: FIG. 10A is the step for bonding the second and third substrates together; FIG. 10B is the step for etching and hole making; and FIG. 10C is the step for bonding the first and fourth substrates together and wiring on the second substrate.

FIG. 10A is to bond together the second substrate 7 and the third substrate 15 by direct bonding with heat or pressure. Bonding should be accomplished after the surfaces of the substrates have been cleaned. Bonding of the two substrates requires that the bonding surface should be flat. This object is achieved by the steps shown in FIGS. 8G and 8H for grinding. In these steps, the sensor and wiring, which are formed on the second surface of the second substrate 7, are embedded in the silicon oxide film 37, which is subsequently ground out. This grinding provides a flat surface without being affected by the irregularities due to wiring etc.

FIG. 10B is to selectively remove silicon in a prescribed region in the first surface of the second substrate 7 by wet etching. In this etching step, the boron diffusion layers 33 and 33 are formed in the first surface (by FIG. 8B) function as the mask. Removing silicon alone forms the recess 7a, making the part 32 (or the equalizer 27) to be exposed. FIG. 10B is also to selectively remove silicon in a prescribed region in the second surface of the third substrate 15. In other words, this step is to remove silicon alone by using the boron diffused layers 42 and 42 (formed on the second surface) as the mask, thereby forming the recess 18. The second surface of the third substrate 15 undergoes laser processing to form the holes 43 and 43. These holes are the inlets (16i and 17i) and outlets (16o and 17o) mentioned above. They penetrate the third substrate 15 in its thickness direction and communicate with the grooves forming the channels.

Incidentally, it is desirable that the second substrate 7 and the third substrate 15 be bonded together first and then the recesses 7a and 18 be formed respectively on the sides opposite to the joint area. In other words, the recesses 7a and 18 are formed after the bonding of the second substrate 7 and the third substrate 15. This method offers an advantage over the method by which the support (thin film) of the structure 21 is formed before the bonding of the substrates. The advantage is close adhesion of thin films, easy handling of substrates, freedom from damage to the structure during processing, and high reliability in fabrication.

FIG. 10C is to bond the first substrate 22 to the second substrate 7, thereby forming the space 23 for heat insulation.

It is also to bond the fourth substrate 24 to the third substrate 15, thereby forming the space 25 for heat insulation. For high reliability, anodic bonding is desirable, which is carried out in a vacuum (under reduced pressure) or in a gas with low thermal conductivity. Bonding in a vacuum results in that the space for heat insulation remains at a reduced pressure. Bonding in a gas (such as air, nitrogen, and argon) with low thermal conductivity results in that the space for heat insulation is filled with such a gas. The thus obtained space for heat insulation produces a great heat insulating effect.

The electrode pad 38 formed in the step shown in FIG. 8I is connected to external circuits (not shown) by wire boding or the like. This makes it possible to supply electricity to the heater and to acquire outputs from the sensor.

Incidentally, the holes 44, 44, . . . (corresponding to the inlets [28i, 29i] and outlets [28o, 29o] mentioned above) in the fourth substrate 24 are previously formed at respective positions corresponding to the holes 43, 43, . . . formed in FIG. 10B.

In this example, the spaces for heat insulation (23, 25) are formed by closing the recesses in the second substrate 7 and the third substrate 15 with the first substrate 22 and the fourth substrate 24, respectively. The reflecting film 26 (mentioned above) may be formed on the walls of the recesses 7a and 18 and the surfaces of the substrates 22 and 24 so as to prevent radiant heat from escaping. This step should be placed before the step in FIG. 10C.

Figure 11A:
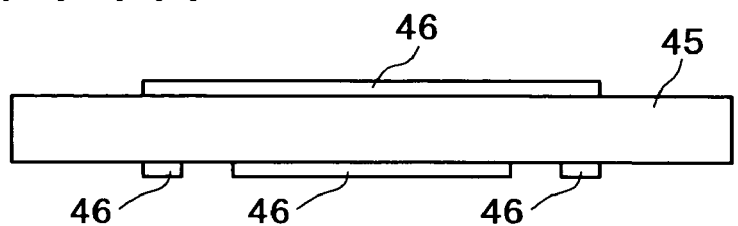
FIGS. 11A to 11E are diagrams illustrating the steps of the manufacturing method applied to the third substrate (in another example).
Figure 11B:
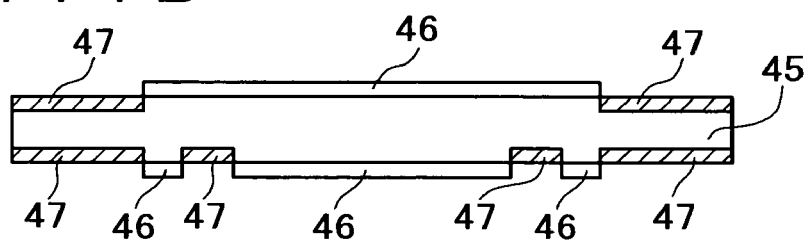
Figure 11C:
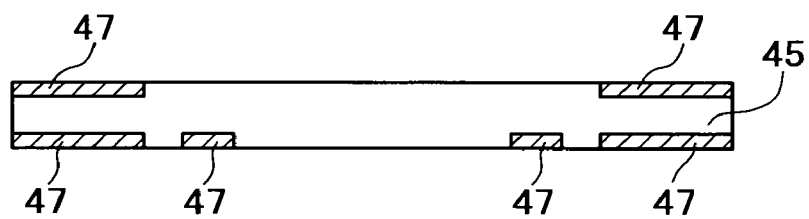
Figure 11D:
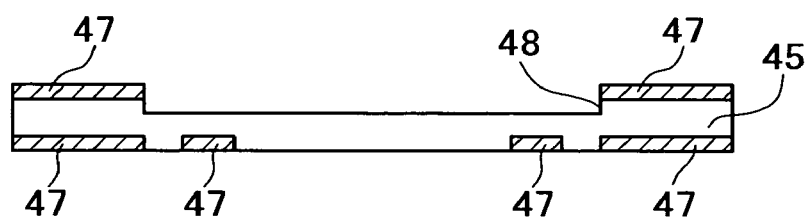
Figure 11E:
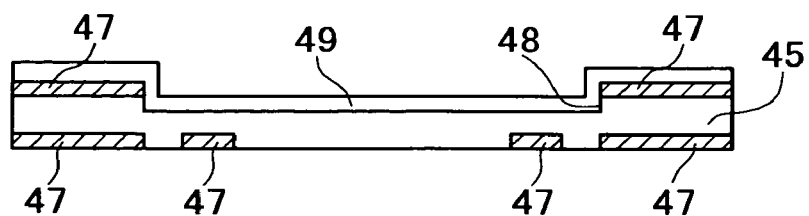

FIGS. 11A to 11E are diagrams showing another example (15A) of production by the following steps to be performed on the third substrate 15, in which: FIG. 11A shows the patterning; FIG. 11B shows the boron diffusion; FIG. 11C shows the etching; FIG. 11D shows the groove forming; and FIG. 11E shows the oxide film forming.

FIG. 11A is to form the oxide film (SiO$_2$) 46, 46, . . . in a prescribed range on the each surface of the silicon substrate 45. (In FIGS. 11A to 11E, the upper and lower surfaces are referred to as "the first surface" and "the second surface", respectively.) This step provides the mask for the subsequent steps.

FIG. 11B is to form the boron-diffused layers 47, 47, . . . . The diffused layers on the first surface of the substrate 45 are formed in the region outside the region in which the grooves for the channels are formed. The diffused layers formed on the second surface of the substrate 45 are used as masks in the subsequent steps.

FIG. 11C is to remove the thermal oxide film 46 by etching.

FIG. 11D is to perform dry etching (DRIE: Deep Reactive Ion Etching) or anisotropic wet etching on the first surface of the substrate 45, thereby removing that part (Si) on which the diffused layer 47 is not formed and forming the groove 48 that becomes the channel. FIG. 11E is to form the silicon oxide film 49 by CVD on the first surface of the substrate 45.

The second substrate (7A) undergoes processing by the steps shown in FIGS. 8A to 8F. FIG. 8E is to form the heater and sensor of metal film by patterning a metallic material such as Pt (platinum) and Ti (titanium).

Figure 12A:
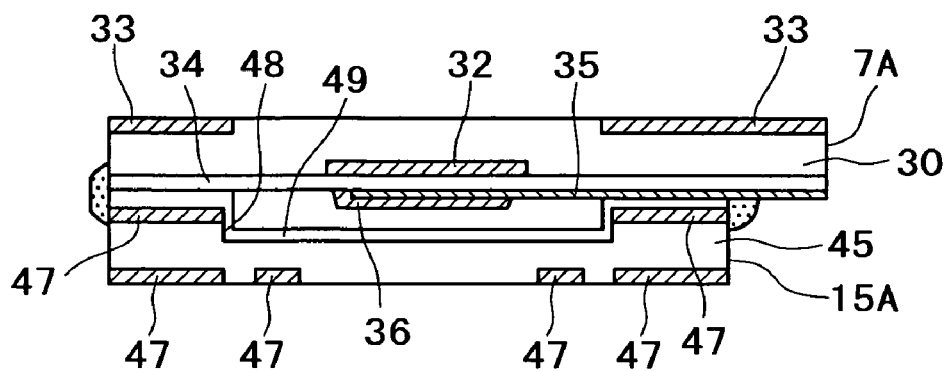
FIGS. 12A to 12C are diagrams illustrating the steps of the manufacturing method applied to the bonding of four substrates (in another example).
Figure 12B:
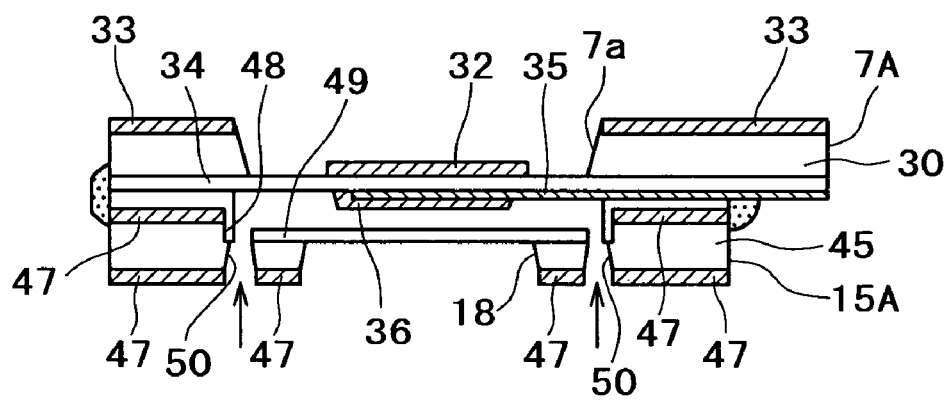
Figure 12C:
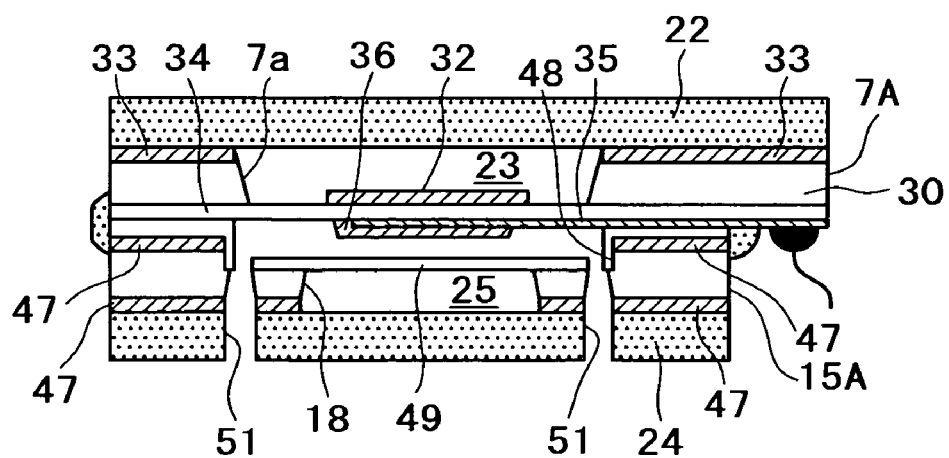

FIGS. 12A to 12C show examples of the process of bonding (for integration) substrates together. The process includes the following steps, in which: FIG. 12A is the step for bonding the second and third substrates together; FIG. 12B is the step for etching and hole making; and FIG. 12C is the step for bonding the first and fourth substrates together.

FIG. 12A is to bond together by adhesion the second substrate 7A and the third substrate 15A with a low-melting glass adhesive or ceramic adhesive.

FIG. 12B is to perform wet etching, thereby selectively removing silicon in a specific area on the first surface of the second substrate 7A. In other words, using as a mask the boron diffusion layers 33 and 33, which have been formed on the first surface of the second substrate 7A in the step shown in FIG. 8B, this wet etching removes silicon and forms the recess 7a, causing the equalizer 32 to be exposed. In FIG. 12B, wet etching is also performed in the same way as above on the second surface of the third substrate 15A so as to selectively remove silicon in a specific area. In other words, using as a mask the boron diffusion layers 47 and 47, which have been formed on the second surface, this wet etching removes silicon and forms the recess 18. Then, the second surface of the third substrate 15A undergoes laser processing to form the holes 50 and 50. These holes correspond to the above-mentioned inlets 16i and 17i and outlets 16o and 17o. The holes penetrate through the third substrate 15A in its thickness direction and communicate with the grooves for each channel.

Incidentally, the recesses 7a and 18 are formed after the second and third substrates 7A and 15A have been bonded together. This ensures close bonding between thin films, which in turn leads to high manufacturing reliability.

In FIG. 12C, the first substrate 22 is bonded to the second substrate 7A and the fourth substrate 24 is bonded to the third substrate 15A. For secure bonding, it is desirable to employ anodic bonding in a vacuum (under reduced pressure) or in a gas having a low thermal conductivity, as mentioned above.

The circuit pattern 35 for wiring has one exposed end as an electrode pad, so that the pad is connected to an external circuit (not shown) by wire bonding or the like. This makes it possible to supply electricity to the heater and to acquire outputs from the sensor.

Incidentally, the holes 51, 51, . . . (corresponding to said inlets 28i and 29i and outlets 28o and 29o) in the fourth substrate 24 are previously formed at those positions corresponding respectively to the holes 50, 50, . . . formed in FIG. 12B.

FIG. 12C may be preceded by a step of forming the reflecting film 26 in the embodiment in which the walls of the recesses 7a and 18 and the surfaces of the substrates 22 and 24 are covered with the reflecting film 26, which prevents radiant heat from escaping.

Figure 13A:
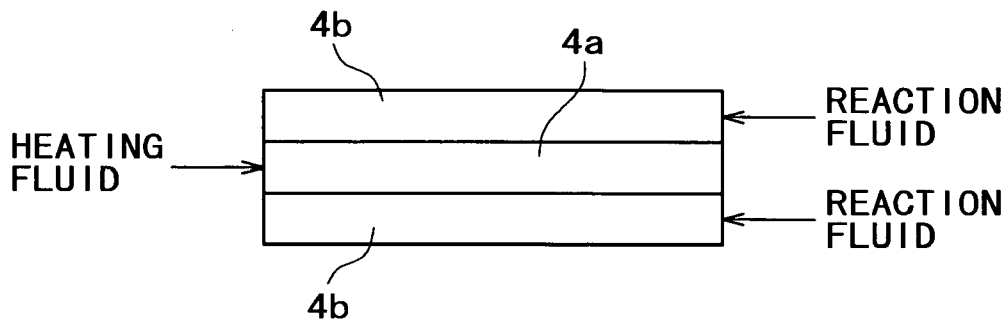
FIGS. 13A to 13C are diagrams illustrating various structures according to the present invention.
Figure 13B:
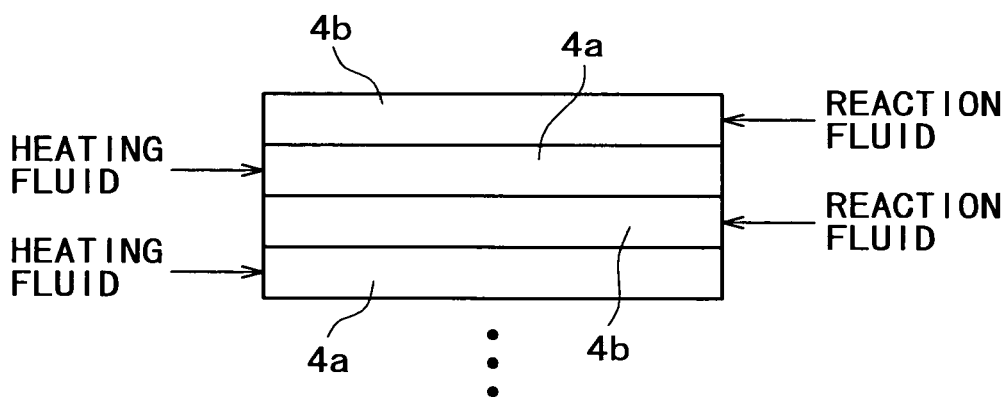
Figure 13C:
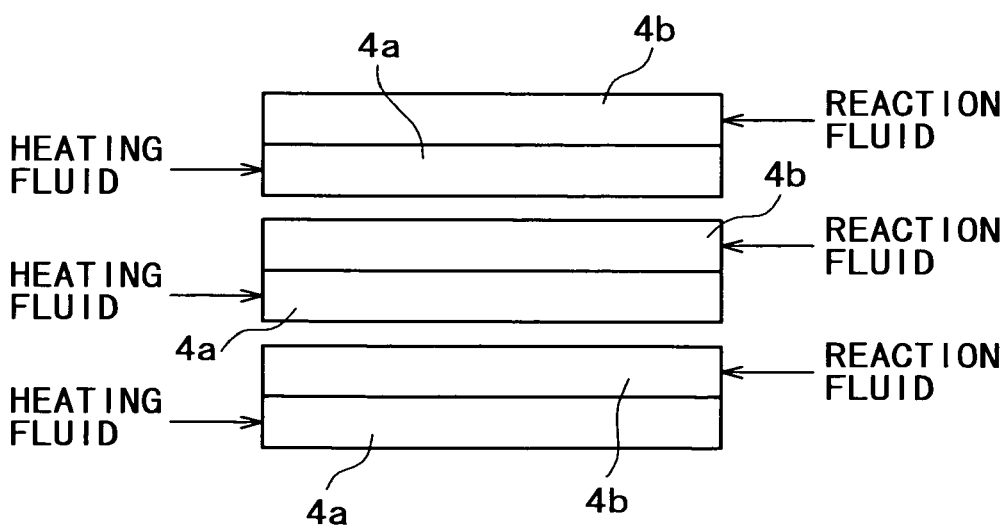

The embodiment of the present invention is not limited to the one mentioned above, but it may assume various structures as explained below with reference to FIGS. 13A to 13C (in which channels are represented simply by straight lines for easy understanding).

Structure in which the heating channel 4a is held between the reaction channels 4b and 4b. This structure contributes to efficient heat usage. See FIG. 13A.

Structure in which the heating channels 4a and 4a and the reaction channels 4b and 4b are arranged alternately. This structure contributes to miniaturization. See FIG. 13B.

Structure in which a plurality of units are arranged side by side, with each unit forming the heating channel 4a and the reaction channel 4b combined together. This structure permits all the units to achieve reactions in parallel. See FIG. 13C.

The above-mentioned structure and manufacturing method offer the following advantages.

The resulting device has the heating channel and the reaction channel thermally connected to each other through the equalizer constituting the heat exchanger. This structure permits heat to be effectively transferred to the reaction channel from the heat source.

The resulting device has the heating channel and the reaction channel extending along each other on the substrate. These channels can be formed and arranged in any form on the substrate to have a desired length. This means that the catalyst layer and the heat exchanger can be formed to account for a larger area on the substrate, which in turn contributes to miniaturization.

The resulting device has the heating fluid and the reaction fluid performing efficient heat exchange therebetween. This leads to effective use of waste heat from the heating fluid, which in turn reduces loss of heat when the fluid is discharged to outside.

The resulting device has the heating channel, reaction channel, and heat exchanger that are arranged in the heat-insulating space. This structure reduces loss of heat escaping to outside.

The resulting device has the channels formed with a thin film. This structure reduces loss of heat escaping to outside through the walls of the channels.

The resulting device has the heat-insulating space whose inner walls are covered with reflecting film that prevents radiant heat from escaping to outside.

The resulting device has a porous layer, which is previously formed in the channel. This structure permits catalyst to be supported on any arbitrary place.

While preferred embodiments of the invention have been described using specific terms, such description is for illustrative purposes only, and it is to be understood that changes and variations may be made without departing from the spirit of scope of the following claims.

What is claimed is:

1. A reactor comprising paired channels for fluids to undergo chemical reactions, said paired channels being at least partially formed in a recess of a first substrate such that said paired channels extend adjacent one another, the reactor also comprising a heat exchanger for performing heat exchange between said paired channels;

wherein each of the paired channels has an inner side-wall adjacent the other paired channel, and an outer side-wall opposite the inner side wall, the inner and outer sidewalls being comprised of a material different than that of the substrate;

wherein the heat exchanger is a structure formed separate from the inner side-walls of the paired channels, the heat exchanger being formed such that at least a portion thereof is located in a recess of a second substrate; and further wherein the side walls of the paired channels are comprised of material formed on or in adjacent grooves formed in the first substrate, a portion of the first substrate being removed to provide a space between the paired channels and the substrate.

2. The reactor as defined in claim 1, in which the paired channels include a first channel for heating and a second channel for reaction and wherein fluids flow through the first and second channels in opposite directions.

3. The reactor as defined in claim 1, in which the paired channels are formed in a meandering shape on the substrate.

4. The reactor as defined in claim 2, in which the heating channel is provided with heating means having a catalyst carrier supporting a catalyst for combustion.

5. The reactor as defined in claim 4, in which the heating means is a resistance heater.

6. The reactor as defined in claim 1, in which the heat exchanger is comprised of a heat-conducting material.

7. The reactor as defined in claim 1, in which the heat exchanger is contained in a sealed heat-insulating space.

8. The reactor as defined in claim 7, in which the heat-insulating space is kept at a reduced pressure or filled with a gas having a low thermal conductivity.

9. The reactor as defined in claim 7, in which the heat-insulating space has its walls covered with reflecting film.

10. The reactor as defined in claim 7, in which the heat exchanger is supported by thin film layer.

11. The reactor as defined in claim 1, in which the channels are provided with an element for temperature detection and/or temperature control.

12. The reactor as defined in claim 1, in which the channels are formed by bonding together a plurality of substrates, one of the substrates in which the heat exchanger is formed.

13. The reactor as defined in claim 12, in which a sealed heat-insulating space is formed by placing the first substrate on the second substrate having a recess in which the heat exchanger is formed.

14. The reactor as defined in claim 13, in which the second substrate is provided with a catalyst carrier supporting a catalyst on a side opposite to the side on which the recess is formed.

15. The reactor as defined in claim 14, in which the catalyst carrier is placed in the channel by bonding a third substrate to the second substrate, said third substrate being said substrate having grooves formed thereon that constitute the channels and one of the channels of the third substrate aligning with the catalyst carrier of the second substrate when bonded.

16. A reformer comprising paired channels to reform a fluid flowing through said channels, with a first channel serving for fuel heating and a second channel serving for reaction, in which said heating channel and reaction channel being at least partially formed in a recess of a first substrate such that said heating and reaction channels extend adjacent one another, the reactor also comprising a heat exchanger for heat exchange between said heating and reaction channels;

wherein each of the paired channels has an inner side-wall adjacent the other paired channel, and an outer side-wall opposite the inner side wall, the inner and outer side-walls being comprised of a material different than that of the substrate;

wherein the heat exchanger is a structure formed separate from the inner side-walls of the paired channels; and further wherein the side walls of the paired channels are comprised of material formed on or in adjacent grooves formed in the first substrate, a portion of the first substrate being removed to provide a space between the paired channels and the substrate.

17. The reformer as defined in claim 16, in which the heating channel has heating means for generating heat to be transferred to the reaction channel through the heat exchanger so that reforming is accomplished by a catalyst supported on a catalyst carrier placed in the reaction channel.

18. A power supply system comprising a reformer and a power generator, said reformer having paired channels to reform a fluid flowing through said channels, with a first channel serving for fuel heating and a second channel serving for reaction, in which said heating channel and reaction channel are formed in a substrate such that said heating and reaction channels extend adjacent one another, and the heating and reaction chambers being at least partially formed in a recess of the substrate, the reactor also comprising a heat exchanger for heat exchange between said heating and reaction channels, wherein each of the paired channels has an inner side-wall adjacent the other paired channel, and an outer side-wall opposite the inner side wall, the inner and outer side-walls being comprised of a material different than that of the substrate;

wherein the heat exchanger is a structure formed separate from the inner side-walls of the paired channels; and said power generator generating electricity by reacting a fluid, which has been reformed after passing through the reaction channel, with another material; and further wherein the side walls of the heating and reaction channels are comprised of material formed on or in adjacent grooves formed in the substrate, a portion of the substrate being removed to provide a space between the channels and the substrate.

19. The power supply system as defined in claim 18, in which the heat generated by the heating means placed in the heating channel is transferred to the reaction channel through the heat exchanger, and hydrogen reformed by a catalyst supported on a catalyst carrier placed in the reaction channel and oxygen are supplied to the power generator for reaction.

20. The reactor as defined in claim 1, wherein each of said paired channels also has an upper wall connecting the inner side-wall and outer side-wall; and wherein said heat exchanger is formed over the upper surfaces of said paired channels extending at least partially in the longitudinal direction of said paired channels, and within said at least partial longitudinal formation, the heat exchanger extending at least substantially the entire width direction of the paired channels from the outer wall of one of said paired channels to the outer wall of the other paired channel.

21. The reactor as defined in claim 1, wherein inlets and outlets for both paired channels are formed on a same surface of the reactor.

22. The reactor as defined in claim 7, wherein the channels are formed adjacent a second sealed heat-insulating space separate from the first heat-insulating space in which the heat exchanger is disposed.

23. The reactor as defined in claim 22, wherein the second sealed heat-insulating space is kept at a reduced pressure or tilled with a gas having a low thermal conductivity.

24. The reactor as defined in claim 22, wherein the second sealed heat-insulating space has its walls covered with a reflecting film.

25. The reactor as defined in claim 22, wherein the second sealed heat-insulating space is formed by placing a sealing substrate on a recess formed in said substrate in which said paired channels are formed, said recess being formed on an opposite side of the substrate than the side having said paired channels.

26. The reformer as defined in claim 16, wherein the heating channel is provided with heating means having a catalyst carrier supporting a catalyst for combustion.

27. The power supply system as defined in claim 18, wherein each of said paired channels also has an upper wall connecting the inner side-wall and outer side-wall; and wherein said heat exchanger is formed over the upper surfaces of said paired channels extending at least partially in the longitudinal direction of said paired channels, and within said at least partial longitudinal formation, the heat exchanger extending at least substantially the entire width direction of the paired channels from the outer wall of one of said paired channels to the outer wall of the other paired channel.

* * * * *